United States Patent
Moreno De Ayala et al.

(10) Patent No.: US 9,413,421 B2
(45) Date of Patent: Aug. 9, 2016

(54) ALGEBRAIC GENERATORS OF SEQUENCES FOR COMMUNICATION SIGNALS

(71) Applicant: OPTIMARK, LLC, San Juan, PR (US)

(72) Inventors: Oscar Moreno De Ayala, San Juan, PR (US); Anatol Zygmunt Tirkel, East Brighton (AU)

(73) Assignee: OPTIMARK, LLC, San Juan, PR (US)

( * ) Notice: Subject to any disclaimer, the term of this patent is extended or adjusted under 35 U.S.C. 154(b) by 26 days.

(21) Appl. No.: 14/125,766

(22) PCT Filed: Dec. 3, 2012

(86) PCT No.: PCT/AU2012/001473
§ 371 (c)(1),
(2) Date: Dec. 12, 2013

(87) PCT Pub. No.: WO2013/078518
PCT Pub. Date: Jun. 6, 2013

(65) Prior Publication Data
US 2015/0078150 A1    Mar. 19, 2015

(30) Foreign Application Priority Data
Dec. 1, 2011 (AU) .................................. 2011905002

(51) Int. Cl.
*H04B 1/7136* (2011.01)
*H04J 13/12* (2011.01)
*H04J 13/14* (2011.01)
*H04B 1/707* (2011.01)

(52) U.S. Cl.
CPC .............. *H04B 1/7136* (2013.01); *H04B 1/707* (2013.01); *H04J 13/12* (2013.01); *H04J 13/14* (2013.01)

(58) Field of Classification Search
CPC ....... H04B 1/707; H04B 1/7136; H04J 13/12; H04J 13/14
See application file for complete search history.

(56) References Cited

U.S. PATENT DOCUMENTS

| 4,382,297 A * | 5/1983 | Farrow ................. H04J 3/0608 370/544 |
| 2004/0131030 A1* | 7/2004 | Kuroyanagi ............ H04J 13/00 370/335 |
| 2004/0161018 A1 | 8/2004 | Maric |
| 2008/0075195 A1* | 3/2008 | Pajukoski ............. H04L 5/0016 375/298 |

FOREIGN PATENT DOCUMENTS

| AU | WO 2011050390 A1 * | 5/2011 | ............ G06T 1/0071 |
| WO | WO 2011/050390 A1 | 5/2011 | |

OTHER PUBLICATIONS

Matrix Construction using cyclic shifts of a column Tirkel et al. IEEE, published information theory Sep. 2005.*

(Continued)

*Primary Examiner* — Gregory Sefcheck
*Assistant Examiner* — Rina Pancholi
(74) *Attorney, Agent, or Firm* — Alston & Bird LLP

(57) ABSTRACT

A device for modulating communication signals comprises a transceiver for receiving and transmitting the signal, a storage medium storing computer implemented program code components to generate sequences and a processor in communication with the storage medium and transceiver. The processor executes computer implemented program code components to generate a family of shift sequences or arrays using exponential, logarithmic or index functions and a polynomial in $i \in Z_{p-1}$ for a finite field $Z_p$ of prime p. Multiple columns of the arrays are substituted with pseudo-noise sequences in a cyclic shift equal to the shift sequence for the respective column to generate a substituted array. The substituted array, or a sequence unfolded using the CRT from the array when the array dimensions are relatively prime, is applied to a carrier wave of the communication signal to generate a modulated communication signal.

22 Claims, 7 Drawing Sheets

(56) References Cited

OTHER PUBLICATIONS

A class of frequency hop codes with nearly ideal characteistics for multiple target recognition Moreno-Maric IEEE 1997.*

Moreno, O., et al., "A Class of Frequency Hop Codes with Nearly Ideal Characteristics for Multiple-target Recognition," *Information Theory, Proceedings of the 1997 IEEE International Symposium*, Ulm, Germany, 1997, p. 126.

Moreno, O., et al., "A New Construction of Multiple Target Sonar and Extended Costas Arrays with Perfect Correlation (Invited Paper)," *Information Sciences and Systems 2006 40$^{th}$ Annual Conference*, Princeton, NJ, 2006, pp. 512-517.

Tirkel, A., et al., "Matrix Construction Using Cyclic Shifts of a Column," *Information Theory, Proceedings of the 2005 IEEE International Symposium*, Adelaide, SA, 2005, pp. 2050-2054.

* cited by examiner

| $i$ | 1 | 2 | 3 | 4 | 5 | 6 |
|---|---|---|---|---|---|---|
| $s_i$ | 5 | 6 | 0 | 6 | 2 | 2 |

| $i$ | 0 | 1 | 2 | 3 | 4 | 5 | 6 | 7 |
|---|---|---|---|---|---|---|---|---|
| $s_i$ | 0 | 1 | 3 | 6 | 2 | 4 | 5 | $\infty$ |

# ALGEBRAIC GENERATORS OF SEQUENCES FOR COMMUNICATION SIGNALS

CROSS-REFERENCE TO RELATED APPLICATIONS

This application is the U.S. National Stage of International Application PCT/AU2012/001473 filed Dec. 3, 2012, which designates the U.S. and was published by the International Bureau in English on Jun. 3, 2013, and which claims the benefit of Australian Application No. 2011905002, filed Dec. 1, 2011, both of which are hereby incorporated by reference in their entirety.

FIELD OF THE INVENTION

The present invention relates to generation of communication signals. In particular, the present invention relates to improved sequences for encoding wireless and optical communications. In particular, but not exclusively, embodiments of the invention relate to frequency hopping and CDMA encoding methods. The improved sequences also have applications in radar, sonar, GPS, ultrasound and cryptography, but are not limited to such applications.

BACKGROUND OF THE INVENTION

Typical radio communications systems, such as cellular voice and data communications systems, have multiple base stations in various locations accessed by mobile or fixed user terminals, such as cellular telephones or wireless web devices. Each base station communicates with a user terminal using a communications channel. The communications channel can be used for sending signals that communicate information, such as user data and/or control data.

A communications channel may consist of transmissions in a set of time slots in a Time Hopping Frame, or in a set of tones in a Frequency Hopping Frame, or in a bi-phase or polyphase sequence in a Code Division Multiple Access (CDMA) Frame. The transmissions are all on a physical carrier frequency. A physical carrier frequency may be a 625 kHz band around a central frequency, such as 800 MHz or 1.9 GHz, or an arbitrary width band around 1 GHz. The same principles apply to radar and sonar, except that the information is in the properties of the channel.

FIG. 1 shows a typical implementation of a modern day CDMA transceiver. The digital operations are typically implemented in a Field Programmable Gate Array (FPGA), possibly in conjunction with a microprocessor. User data is modulated by a special binary or n-ary sequence, which is converted into phases of a carrier around 1 GHz by a process called Direct Digital Synthesis. This consists of looking up a sine/cosine table at a fixed clocking rate, thereby generating a modulated subcarrier at tens of MHz. The subcarrier is generated in two versions, I (in-phase) and Q (quadrature), so that it can be up-converted by any high stability oscillator using single sideband (SSB) up-conversion. This modulated carrier is amplified, sent to an antenna and then broadcast.

In the receiver, the received carrier, which is modulated by the user data and a special sequence is amplified and down-converted into digital I and Q data streams at the subcarrier frequency. These streams are down-converted digitally and the baseband signal converted from a Cartesian basis into magnitude and phase (polar basis). The magnitude is used to control the gain of the receiver front end, whilst the phase is used as an input to a correlator. The other input to the correlator is a replica of the reference version of the special sequence. The special sequence has the property that a periodic correlation with a time shifted version of itself (autocorrelation) is very low, except when the time shift is a multiple of the period of the sequence, or very close to that. Whenever that happens, the correlation is a very large complex number, the magnitude of which indicates how closely the timing matches, and the phase of which indicates how closely the phase of the transmitted carrier modified by the channel matches that of its replica in the receiver. This phase fluctuates in response to the data at the transmitter end. In this manner, the original user data can be recovered. The deviations from ideal correlation or expected phase can be used to track any misalignment, or channel imperfections in various tracking loops e.g. tau dither. Other special sequences may be used to synchronize the receiver with the transmitter from a cold start.

An issue arises if there is more than one user in the above scenario. Then, the special sequences must have low cross-correlation with each other. Otherwise, any receiver circuits such as those described in FIG. 1, could get "confused" and decode the data from an unintended user or just produce scrambled data. Therefore, sequence sets with low off-peak autocorrelation and low cross-correlation are required for a multiple user environment Binary (two phase) sequence sets are particularly prized for this application. The best known of these are Gold sequences and the large and small Kasami sequences. These are available for special lengths and have fixed family sizes, sequence balance, and resistance to attack. For example, Gold sequences of length 1023 are used as short, coarse acquisition codes in GPS.

The proliferation, acceptance and reliance upon personal mobile communications has created the need for flexible, mobile networks ranging from femtocells typically used in homes and small businesses to regular cells covering larger areas. However, traditional methods of multiplexing multiple users by frequency or time division are inefficient and ineffective in guarding against multi-path and mutual interference, noise and jamming or other attacks.

Code division multiple access (CDMA), frequency hopping, orthogonal frequency-division multiplexing (OFDM), and ultra wide band (UWB) techniques have been developed in an effort to overcome these shortcomings. These techniques have recently been enhanced with the use of Multiple Input, Multiple Output (MIMO), polarization and space-time coding. All these techniques rely on sets of digital sequences with low off-peak autocorrelation and low cross-correlation. For fixed communication networks, it may be possible to coordinate the signals, so that these low auto- and cross-correlation values only need to be achieved for a specified set of delays. However, due to the mobility of the handsets, the mobile-to-base links cannot be precisely coordinated and require some means of separating the different users within the same channel.

One way of achieving this is by modulating the phase of the carrier signal of each user by a unique signature sequence to achieve CDMA. Since such sequences spread the spectral occupancy of each user they are also called spreading codes in spread spectrum terminology. It is mathematically impossible to create signature sequences that are orthogonal for arbitrary starting points and which make full use of the code space. Therefore, unique "pseudo-random" or "pseudo-noise" (PN) sequences are used in asynchronous CDMA systems. A PN code is a binary sequence that appears random, but can be reproduced in a deterministic manner by intended receivers. These PN codes are used to encode and decode a user's signal in asynchronous CDMA. PN sequences are statistically uncorrelated and the sum of a large number of PN sequences results in multiple access interference (MAI) that is approximated by a Gaussian noise process due to the central limit theorem.

Gold codes and Kasami codes are examples of a PN code suitable for this purpose because there is low correlation between the codes. However, if all of the users are received with the same power level, then the variance (e.g., the noise power) of the MAI increases in direct proportion to the number of users. The signals of other users will appear as noise to the signal of interest and interfere slightly with the desired signal in proportion to number of users.

Gold codes are a family of sequences based on binary addition of preferred pairs of maximal length sequences (m-sequences). Codes exist for lengths $2^n-1$, $n \neq 0 \mod 4$. Each family has $2^n+1$ codes, the off-peak autocorrelation and cross-correlation of which is three valued. For n odd, the values are optimal.

Kasami sequences exist for lengths of the type $2^n-1$, n even. There are two types: a small set and a large set. The small set is based on the binary addition of preferred pairs of sequences, one of which is of length $2^n-1$, whilst the other is of length $2^{n/2}-1$. The large set is formed by binary addition of triples of suitably chosen sequences of length $2^n-1$.

Other constructions of CDMA sequences include No Kumar, Kerdock and Bent Sequences. All known constructions are available for only a few selected lengths, many are unbalanced, and all have normalized linear complexities which tend to 0 as sequence length Increases.

For frequency hopping systems, each user is assigned a frequency hopping code of period T, where a single tone or a combination of tones is transmitted during each time interval, or chip period t. The low off-peak autocorrelation and low cross-correlation of the codes ensures that the data sent to or from each user suffers low and constrained interference, which is tolerable, or corrected for by standard error correction techniques. This is also true for UWB systems, where time hopping instead of frequency hopping is involved. Similar methods are also used in optical fiber communications, where wavelength selection is equivalent to frequency assignment and the codes are known as Optical Orthogonal Codes (OOC).

Existing frequency hopping codes include Costas arrays which are doubly periodic arrays with one dot per row and column, such that all the vectors separating the dots are unique. The off-peak periodic dot autocorrelation (auto hit) of such arrays is exactly 1. Generally, such arrays are solitary, although pairs of arrays with dot cross-correlation (cross hit) constrained by 2 are possible.

Hyperbolic sequences are another example of existing frequency hopping codes. For Finite Field GF(p) these are defined as:

$$y(k) = \alpha/k \pmod{p} \; k=1,2,\ldots,p-1 \text{ and some } \alpha \neq 0 \in GF(p)$$

Hyperbolic sequences of length p−1 have at most two hits in its auto-correlation function except for the (0,0) shift, and at most two hits in its 2D cross-correlation function formed with any other code from the same family.

An (n, ω, λ) Optical Orthogonal Code (OOC) C where $1 \leq \lambda \leq \omega \leq n$, is a family of {0,1} sequences of length n and Hamming weight ω satisfying:

$$\Sigma_{k=0}^{n-1} x(k) y(k \oplus_n \tau) \leq \lambda \text{ whenever either } x \neq y \text{ or } \tau \neq 0.$$

λ is the maximum correlation parameter. A review of known constructions is presented in O. Moreno, R. Omrani, and S. V. Maric, "A New Construction of Multiple Target Sonar and Extended Costas Arrays with Perfect Correlation" 40th Annual Conference on Information Sciences and Systems, 22-24 Mar. 2006, pp. 512-517.

Regarding existing multi-target codes, by definition the number of hits in the 2D auto-correlation function of Costas arrays is ideal. However, the multi-user environment and rather poor 2D cross-correlation properties of Costas arrays necessitated the construction of other sequence families such as nth order congruence codes. GF(p) denotes the Finite Field over a prime p, and $\widetilde{GF}(p) = GF(p) - \{0\}$. Therefore, the nth order congruence sequence of length p is defined by:

$$y(k) = \alpha k^n \pmod{p} \; 0 \leq k \leq p \text{ and some } \alpha \in \widetilde{GF}(p)$$

An nth order congruence sequence constructed over the Field of prime p is a full sequence when $d = (\phi(p), n) = 1$ where φ denotes the Euler φ function and $d = (x,y)$ is the greatest common divisor of x and y. An nth order congruence sequence (n>1) of length p has at most n−1 hits in its 2D auto-correlation function except for the (0,0) shift, and at most n hits in its 2D cross-correlation function formed with any other sequence from the same family.

All of the methods described above can also be used in radar, where the encoded transmitted signal is reflected or scattered by the environment and is received at a receiver co-located with the transmitter (monostatic) or located elsewhere (bistatic). In the case of radar, the information is in the magnitude, phase, frequency, polarization or spatial profile of the reflected or scattered signal.

The reference to any prior art in this specification is not, and should not be taken as, an acknowledgement or any form of suggestion that the prior art forms part of the common general knowledge.

OBJECT OF THE INVENTION

It is a preferred object of the present invention to provide a system and/or a method and/or an apparatus that addresses or at least ameliorates one or more of the aforementioned problems or provides a useful alternative.

SUMMARY OF THE INVENTION

Generally, the present invention relates to methods and apparatus for encoding communication signals for applications such as, but not limited to mobile communications, radar, sonar, GPS, ultrasound and cryptography. Embodiments of the methods include constructing families of shift sequences or arrays using polynomials and using the shift sequences as frequency/wavelength or time hopping patterns for digital communications. Methods include converting the shift sequences, such as substituting columns of frequency hopping arrays with pseudo random noise sequences and applying the resulting arrays to a range of communications depending on the characteristics of the resulting arrays.

According to one aspect, but not necessarily the broadest aspect, the present invention resides in a method of modulating a communication signal including:

generating a family of shift sequences or arrays using exponential, logarithmic or index functions and a polynomial or a rational function polynomial in $i \in \mathbb{Z}_{p-1}$ for a finite field $\mathbb{Z}_p$ of prime p;GF(p$^m$) or any function that produces a frequency hopping pattern, and substituting multiple columns of the arrays with pseudo-noise sequences in a cyclic shift equal to the shift sequence for the respective column to generate a substituted array; and applying the substituted array, or a sequence unfolded from the array when the array dimensions are relatively prime, to a carrier wave of the communication signal to generate a phase modulated communication signal.

Suitably, a shift sequence of the family has the form: $s_i = Ag^{2i} + Bg^i + C$ where g is a primitive root (generator) of $Z_p$ and i ranges from 1 to p−1, where A, B, C are elements of the base field $Z_p$.

The method may include generating a (p−1)×p array having (p−1) columns each of length p. Alternatively, the method may include generating a p×(p−1) array with p columns, each of length (p−1) where the index function is used. Alternatively, the method may include generating a p×(p+1) array with p columns, each of length (p+1).

Suitably, the method includes generating the family of shift sequences using a quadratic exponential map of Construction A1 or A2.

Suitably, the method includes generating the family of shift sequences using a quadratic discrete logarithm map as an inverse of Construction A1 or A2.

The method may include generating the family of shift sequences using full cycles generated by a rational function map, such as Family B.

The method may include generating the family of shift sequences from known frequency hopping patterns, time hopping patterns or optical orthogonal codes, or by transforming known CDMA families into shift sequences.

The pseudo-noise sequence is over any alphabet and can be one of the following: a binary or almost binary Legendre sequence; a ternary or polyphase Legendre sequence; a binary or polyphase m-sequence; a GMW sequence; a twin prime sequence; a Hall sequence; a Sidelnikov sequence; another low off-peak auto-correlation sequence. Such pseudo-noise sequences can be computer-generated or generated recursively as described herein.

The substituted array may be in the form of one of the following: a bi-phase array for modulation of a CDMA signal; a multi-target tracking radar signal; a multi-target tracking sonar signal; an ultrasound signal; an optical orthogonal code array for modulation of an optical CDMA signal.

The method may include substituting at least one column of the arrays with a constant column such that the substituted array is balanced and has symmetric auto-correlation values.

Suitably, the method includes substituting multiple rows of the arrays with an array comprising a maximum of one dot per row.

The method may include constructing groups of families of sequences or arrays by applying invariance operations to parent arrays and unfolding the parent or the transformed arrays using the Chinese Remainder Theorem and assigning different groups of users different families of sequences or arrays.

The method may include substituting blank columns in the shift sequence to balance a CDMA sequence.

The shift sequences can be used in their own right as frequency hopping patterns, time hopping patterns, optical orthogonal codes or sonar sequences.

Increasing linear complexity may be achieved by using a shift sequence and a column sequence in composition and unfolding the composition into a long sequence using the Chinese Remainder Theorem.

The method may include generating a family of multidimensional arrays using a composition of a family of shift sequences or frequency hop patterns and a column sequence and modulating the phase of a multiplicity of orthogonal carriers and optionally dual polarization.

The method may include converting a column solitary sequence with low off-peak autocorrelation into a family of longer sequences or arrays with low off-peak autocorrelation and cross-correlation.

The method may include unfolding a solitary array from Construction A1 or A2 using a degree one polynomial using CRT, and substituting rows in a larger array used to produce Family B with commensurate row length with the unfolded solitary array, resulting in a family of even larger arrays with good correlation and high linear complexity. Suitably, the substitution is performed as a cascade or is performed recursively.

Suitably, the family of sequences produced by using the shift sequence to construct arrays which are then unfolded using CRT has a linear complexity greater than 45% of the sequence length, regardless of the sequence length.

Suitably, the shift sequence is obtained from an m-sequence, and the substitution column is a ternary or other non-binary pseudo-noise sequence, resulting in a new long pseudo-noise sequence obtained by CRT from the array.

Suitably, a family of shift sequences is obtained by a combination of trace map and discrete logarithm from a singly or doubly periodic shift sequence produced by an m-sequence. The family thus produced may be the small Kasami set, or the No-Kumar set.

The sequences may be used as error correcting codes or cryptographic codes.

The resulting family of arrays, or their multi-dimensional generalizations, can be used in watermarking or other applications requiring families of arrays with cryptographic immunity.

According to another aspect, but not necessarily the broadest aspect, the present invention resides in a device for modulating a communication signal, the device comprising:

a transceiver for receiving and transmitting the signal;

a storage medium storing computer implemented programme code components to generate sequences; and a processor in communication with the storage medium and the transceiver to execute at least some of the computer implemented programme code components to cause:

generating a family of shift sequences or arrays using exponential, logarithmic or index functions and a polynomial or a rational function polynomial in $i \in \mathbb{Z}_{p-1}$ for a finite field $\mathbb{Z}_p$ of prime p;

substituting multiple columns of the arrays with pseudo-noise sequences in a cyclic shift equal to the shift sequence for the respective column to generate a substituted array; and applying the substituted array, or a sequence unfolded from the array when the array dimensions are relatively prime, to a carrier wave of the communication signal to generate a modulated communication signal.

Further aspects and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein.

Figure 1:
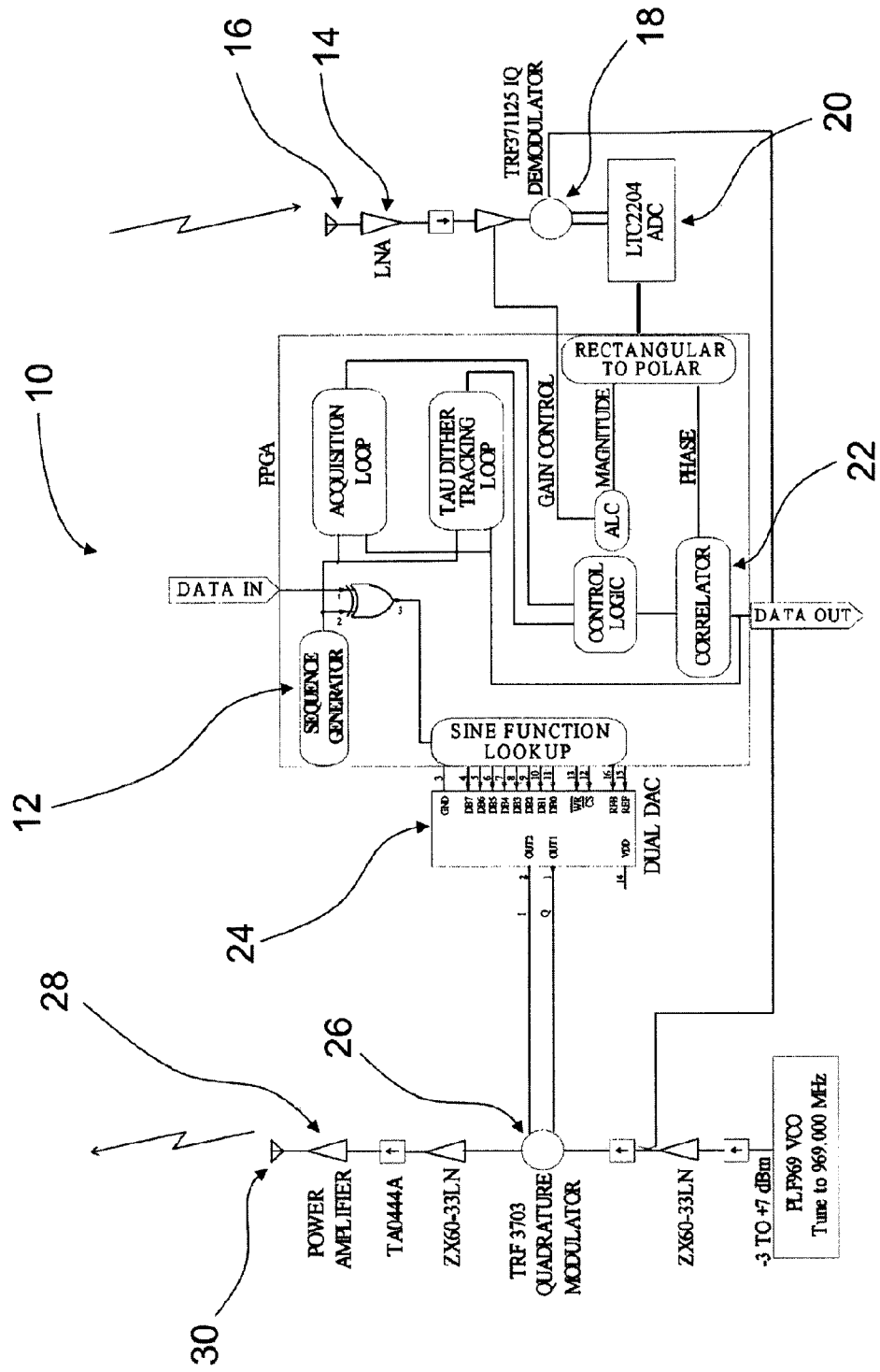
FIG. 1 is a schematic diagram illustrating a device for modulating a communication signal in accordance with embodiments of the present invention.

Skilled addressees will appreciate that elements in the drawings are illustrated for simplicity and clarity and have not necessarily been drawn to scale. For example, drawings may be schematic and the relative dimensions of some of the elements in the drawings may be distorted to help improve understanding of embodiments of the present invention.

DETAILED DESCRIPTION OF THE PREFERRED EMBODIMENTS

The present invention includes a new construction of codes for applications such as, but not limited to communications, mobile communications, radar, sonar, ultrasound and cryptography. In particular, the present invention includes a new construction of frequency hopping codes and methods of converting them into CDMA codes, which complement existing CDMA codes, and are superior in performance. One family of the new sequences is nearly optimal in terms of the Welch bound, whilst another is optimal, i.e. no better families can exist. It should be noted that these are the first such sequence families since Kasami (1966) and Gold (1967) announced their constructions, and since Welch (1974) discovered the bound.

Performance criteria for communications, such as wireless CDMA, include the following seven criteria:

1. Off-peak autocorrelation—a low bound is desirable;
2. Cross-correlation—a low bound is desirable;
3. The largest family size is desirable. For binary sequences of a given length, this is constrained by the Welch bound;
4. Code length is usually dictated by the data rate and by the required family size;
5. Alphabet. Binary is preferred. Zeros (absence of carrier) are best avoided to maintain high efficiency;
6. Balance. The sequence should have equal number of +1's and −1's over a complete period. This is desirable so that the spectrum is flat and the residual carrier power is low for efficiency and low probability of intercept; and
7. Linear Complexity (LC). This is a measure of the minimum size of a shift register which could be used to generate the sequence, or the degree of a recursion polynomial to achieve the same. This should be as high as possible. The Berlekamp-Massey algorithm can determine the polynomial from 2LC terms of the sequence. Therefore, even an unsophisticated attacker can decode the sequence given 2LC terms received without error. Therefore, LC is a measure of the security of the sequence. A useful measure is the linear complexity expressed as a fraction of the sequence length, i.e. Normalized Linear Complexity (NLC). In CDMA, radar, watermarking and cryptography it is desirable to use long sequences with high NLC. All known constructions of families of sequences with low off-peak autocorrelation and low cross-correlation have NLC which asymptotes to zero as the sequence length increases. The constructions in accordance with the present invention are the first to produce families of sequences with NLC that does not asymptote to zero. In fact, many of the sequences have NLC between 0.5 and 0.9 and even higher, regardless of length. In watermarking applications, two-dimensional or multi-dimensional arrays are embedded in host data such as image, audio, or video. The methods described herein can be used to construct arrays with high multi-dimensional complexity which can be used as watermarks. Such watermarks are more secure because an attacker who manages to detect a part of the watermark cannot deduce the rest of the watermark from that information. For NLC=0.5 or greater, the attacker needs to detect the whole array.

The present invention makes use of algebraic techniques applied to Finite (Galois) Fields. Embodiments of the present invention are based on families of patterns with low off-peak auto-correlation and low cross-correlation.

With reference to FIG. 1, embodiments of the present invention include a device 10 for modulating a communication signal, such as the transceiver briefly described above. Device 10 can be implemented as a FPGA and comprises a sequence generator 12 for generating the sequences in accordance with the present invention as described herein. In some embodiments, a storage element such as a memory comprising a storage medium, stores computer implemented programme code components for generating the sequences and a processor coupled to be in communication with the sequence generator 12 for executing at least some of the computer implemented programme code components for modulating the communication signal. Device 10 can comprise a low noise amplifier (LNA) 14 coupled to a receiving antenna 16 to boost the received signal to an acceptable level. A local oscillator and mixer converts the signal into a suitable intermediate frequency (IF) or zero frequency (Direct Conversion). This signal is usually, but not necessarily, digitized, demodulated and correlated with a local version of the code used in the signal transmission process in the device 10. Hence, device 10 can comprise demodulator 18, analogue-to-digital converter (ADC) 20 on the receiver side, correlator 22, and digital-to-analogue converter (DAC) 24, modulator 26, amplifier 28 and transmitting antenna 30 on the transmitter side. It will be appreciated that a single antenna can be shared for reception and transmission.

Execution of at least some of the computer implemented programme code components includes generating a family of shift sequences or arrays using exponential, logarithmic or index functions and a polynomial in $i \in \mathbb{Z}_{p-1}$ for a finite field $\mathbb{Z}_p$ of prime p.

Execution of at least some of the computer implemented programme code components includes substituting multiple columns of the arrays with pseudo-noise sequences in a cyclic shift equal to the shift sequence for the respective column to generate a substituted array.

Execution of at least some of the computer implemented programme code components includes applying the substituted array, or a sequence unfolded from the array when the array dimensions are relatively prime, to a carrier wave of the communication signal to generate a modulated communication signal 18.

According to some embodiments, the sequence generator to produce the sequence sets of the present invention can be implemented in memory for relatively short sequences. For example, the sequences can be constructed off-line, using higher level packages, such as Mathematica, Maple, Matlab or Magma, and then stored in RAM and read out at a suitable clock rate. This method is limited by RAM capacity. For systems which already use this method of sequence generation, existing sequences can be replaced by sequences of the present invention without changes in firmware or software. According to other embodiments, longer sequences can be constructed "on the fly" using FPGA logic cells and shift registers. One block is used to construct a shift, sequence and one block to construct a column sequence. The two results are combined into an array, which is read out sequentially as described herein.

Generation of the families of shift sequences or arrays will now be described in detail followed by examples with reference to FIGS. 2-11.

A base field is chosen and a multiplicative group associated with it. For $\mathbb{Z}_p$ this can be the group $\mathbb{Z}_p/\{0\}$, which is of cardinality (p-1) and has a generator (primitive root) g. Alternatively, it can be the set of all rationals Q i.e. quotients of any pair of members of $\mathbb{Z}_p$, including 0. The cardinality of this group is (p+1) and its generator is a transformation mapping discovered and analyzed by O. Moreno in the 1970's. Henceforth, constructions based on this map are referred to as "rational constructions". Every member of such groups can be expressed as a power of its generator. Therefore, the first construction defines an exponential mapping between the integers $\mathbb{Z}_{p-1}$ and $\mathbb{Z}_p/\{0\}$ and the second construction between $\mathbb{Z}_{p+1}$ and $\{\mathbb{Z}_p U \infty\}$. An inverse (logarithmic) mapping is also possible. It is also envisaged that there are other mappings which possess the required properties.

In accordance with embodiments of the present invention, a family of shift sequences or arrays is constructed using a polynomial or a rational function polynomial in $i \in \mathbb{Z}_{p-1}$, e.g. the quadratic $Ag^{2i}+g^i$, where A is an arbitrary non-zero constant. In such a family of p-1 shift sequences, the auto and cross hit values are bounded by 2. For higher degree polynomials, the bound is the degree of the polynomial. In accordance with embodiments of the present invention, these shift sequences can be used to encode communication signals. For example, the shift sequences can be used as new frequency hopping patterns with bounded correlation.

In accordance with embodiments of the method of the present invention, the columns of the arrays can be substituted by different types of pseudo-noise sequences in a cyclic shift equal to the value of the shift sequence for the respective column of the array. Generally, if the substitution sequence is over +1 and -1, or higher roots of unity, and possibly includes a limited number of zeros, the resulting array can be applied to, for example, wireless CDMA. If the substitution sequence is over 1, 0 the resulting array can be used in, for example, optical CDMA or multi-tone frequency hopping.

The arrays constructed in the example described above have sides p and p-1 or p and p+1. These sizes are relatively prime and therefore these arrays can be unfolded using the Chinese Remainder Theorem into long sequences of length p(p-1) or p(p+1).

Patent application WO 2011/050390 by the present inventors, which is incorporated herein by reference, discloses the following construction D2 (Quadratic Generalization-Family of Arrays):

$$f_{A,B,C}(i)=A(\alpha^i)+B\alpha^i+C, f:Z_{p-1}{}^m \rightarrow Z_p{}^m-\{0\}$$

where A, B, C are elements of the finite field $GF(p^m)$. Any two arrays in this family of arrays which are multidimensional cyclic shifts of one another are called equivalent. The autocorrelation of such arrays and the cross-correlation between any non-equivalent arrays is bounded by two. This construction is listed in the section covering constructions in three dimensions and higher. However, for m=1 it can be used to generate two dimensional arrays, which can also be unfolded into one dimensional sequences.

Consider a shift sequence:

$$s_i=Ag^{2i}+Bg^i+C$$

where g is a primitive root of $Z_p$ and i ranges from 1 to p-1. This is a shift sequence which generates a (p-1)×p array having (p-1) columns each of length p.

Vertical shifts of $s_i$ yield equivalent arrays ($s_i+v \equiv s_i$). A representative of the vertical shift equivalence class is selected by putting C=0:

$$s_i=Ag^{2i}+Bg^i$$

Horizontal shifts of $s_i$ yield equivalent arrays ($s_{i+h} \equiv s_i$):

$$s_{i+h}=Ag^{2(i+h)}+Bg^{i+h}=Ag^{2(i+h)}+(Bg^h)g^i$$

As h runs through all values from 0 to p-2, $g^h$ takes on all non-zero values in $Z_p$ including the multiplicative inverse of B. Therefore, a representative of the equivalence class of horizontal shifts can be taken as:

$$s_i=Ag^{2i}+g^i$$

There are p choices of A (including A=0, the exponential Welch construction), so there are p arrays in the family.

Consider two such arrays $s_i=Ag^{2i}+g^i$ and $s_i'=A'g^{2i}+g^i$ and examine the cross-correlation between them. An array produced by $s_i$ is shifted horizontally by h and vertically by v:

$$\Delta=s_i'-s_{i+h}-v=A'g^{2i}+g^i-Ag^{2(i+h)}+g^{i+h}-v$$

$$\Delta=(Ag^{2h}-A')g^{2i}+(g^h-1)g^i-v$$

This is a quadratic in $g^i$. Hence there are at most 2 columns which can match in cyclic shift between the two arrays. This is also true for auto-correlation, where A=A'. The array columns of the arrays are of length p, so they can be substituted by binary or almost binary Legendre sequences. For p=4k+1, the leading term of the Legendre sequence must be 0, whilst for p=4k-1, the leading term can be set to +1. The peak autocorrelation for a column is p-1 for p=4k+1 and p for p=4k-1. Hence, the array auto-correlation and cross-correlation values are as shown in TABLE 1 below.

TABLE 1

| Prime | Autocorrelation Peak | 0 Match | 1 Match | 2 Match |
|---|---|---|---|---|
| 4k + 1 | $(p - 1)^2$ | $-p + 1$ | 1 | $p + 1$ |
| 4k - 1 | $p \times (p - 1)$ | $-p + 1$ | 2 | $p + 3$ |

The arrays described above can be unfolded to yield sequences of length $(p-1) \times p$. This is because $\gcd[(p-1),p]=1$. Therefore, the Chinese Remainder Theorem (CRT) can be employed. The process is equivalent to diagonal unfolding of the array. Clearly, the exponential construction is superior.

With further reference to patent application WO 2011/050390, two matrices $s_i$ produced by mapping polynomials over finite fields using a logarithmic function are as follows:

$$s_i = \log_\alpha(A\alpha^{2i} + B\alpha^i + C) \qquad \text{Construction A1}$$

$$s_i = \log_\alpha(A_n\alpha^{ni} + A_{n-1}\alpha^{(n-1)i} + \ldots + A_k\alpha^{ki} \ldots + A_0) \qquad \text{Construction A2}$$

$\alpha$ is a primitive element of $Z_p$ (p) and n is any positive integer, including 1. i is an index taking on the values 0, 1, 2, ..., p−2. $s_i$ takes on the values 0, 1, 2, ..., p−2, ∞, where ∞ results from the argument of the log function being equal to 0. A, B, C and any of the $A_k$ are suitably chosen entries from $Z_p$.

1. $Z_p = \{0, \alpha^1, \alpha^2, \ldots, \alpha^{p-1}\}$. In this context log refers to $\log_\alpha x = j$ implies that $x = \alpha^j$.
2. Construction A2 is a generalization of A1, where the family size is larger, but the auto and cross-correlations are also larger.
3. A matrix S is produced by placing an entry of 1 in the horizontal position i and vertical position $s_i$ and 0 elsewhere.
4. Note that the log mapping is 1:1, i.e. there is a single value of $s_i$ for each i.

The matrices from A1 have the following property: for any non-zero doubly periodic shift of such a matrix, its auto correlation is equal to or less than 2. Some of the matrices generated are shifts of each other, and hence have bad correlation. There is an equivalence relation which makes $(p-1)^2$ choices of A, B or C redundant, and hence there are approximately p inequivalent matrices in the family. It can be shown that all inequivalent quadratics can be represented by p choices of C in: $s_i = \log_\alpha(x^2 + x + C)$.

Each of these matrices from A1 can be assigned to a different user. A doubly periodic cross-correlation between any pair of such matrices is also equal to or less than 2.

Columns with ∞ in them can be replaced by a string of 0's. This reduces the peak autocorrelation by p−1, but has almost no effect on the off-peak autocorrelation, or the cross-correlation. Where there is only one column with a ∞, the column can be replaced by a string of constant values, including +1 or −1. The autocorrelation is even better than when the constant is 0 whilst the cross-correlation can increase by p−1. When there are two or more entries with ∞, the best option is to replace them by a string of 0's. This reduces the peak autocorrelation even further, and makes such arrays less desirable.

For Construction A1, ∞ may occur 0, 1, or 2 times, depending on the choice of A, B and C. 0 occurs if the polynomial is irreducible, 2 if it is reducible with two factors and 1 if it is a square.

Therefore it is desirable for the quadratic in A1 to be irreducible. Quadratics of the form $x^2+x+C$ yield arrays, which are not related by two dimensional cyclic shifts, and are hence inequivalent. It can be shown that for odd p, $$C = \frac{1 - \alpha^{2k+1}}{4}$$

results in an irreducible quadratic, whilst for even p, a choice of C such that $\text{Tr}_p^{p^2}(C) = 1$ results in an irreducible quadratic. Examples of arrays generated in accordance with embodiments of the present invention will now be discussed with reference to FIGS. 2-8.

Figure 2:
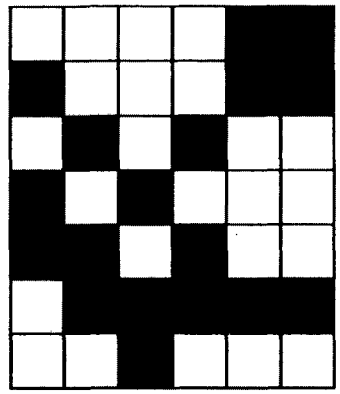
FIG. 2 shows a 6×7 bi-phase array generated in accordance with embodiments of the present invention, in which +1 are white cells, −1 are black cells.
Figure 3:
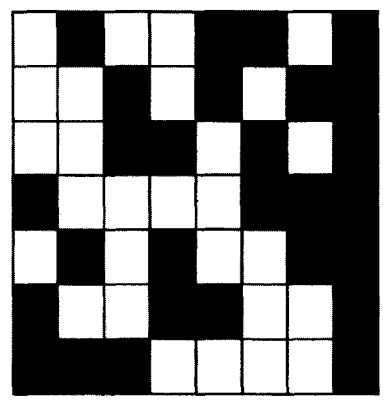
FIG. 3 shows an 8×7 bi-phase array generated from exponential rational construction in accordance with embodiments of the present invention.

With reference to FIG. 2, consider a $(p-1) \times p$ array where p=7, g=3, $S_i = g^{2i} + g^i$. This generates the 6×7 bi-phase array obtained from the exponential quadratic $g^{2i} + g^i$. The unfolded sequence using CRT is as follows:

1, 1, 1, 1, 1, −1, 1, 1, 1, −1, 1, 1, 1, 1, 1, 1, 1, 1, −1, −1, −1, 1, −1, 1, −1, −1, −1, 1, −1, −1, 1, 1, 1, −1, 1, −1, −1, −1, −1, −1, −1, 1.

In binary format, this translates to:

0, 0, 0, 0, 0, 1, 0, 0, 0, 1, 0, 0, 0, 0, 0, 0, 0, 0, 1, 1, 1, 0, 1, 0, 1, 1, 1, 0, 1, 1, 0, 0, 0, 1, 0, 1, 1, 1, 1, 1, 1, 0

The auto-correlation values are as shown in TABLE 2.

TABLE 2

| Autocorrelation Value | −6 | +2 | +10 | +42 |
|---|---|---|---|---|
| Frequency of Occurrence | 19 | 14 | 8 | 1 |

With reference to FIG. 2, consider a $(p+1) \times p$ array where p=7, which generates the 8×7 bi-phase array obtained from the exponential rational construction, called Family B: Rational Function Characteristic p. Let $F_{p^m}$ be a finite field with $p^m$ elements, where p is a prime. Let P be the projective line over $F_{p^m}$, in other words P is $F_{p^m}$ plus ∞. Consider $$f(x) = \frac{Ax + B}{Cx + D}$$

where $AD \neq BC$ and A, B, C, D $\in F_{p^m}$. The substitution of elements of P in f(x) produces a permutation of the elements of P. If g(x) is another fractional linear transformation, similar to f(x), then there are exactly two values of x in P for which f(x)=g(x). The following result is due to Berlekamp and Moreno: Whenever $x^2 + x + \alpha$ is irreducible, and $\alpha$ is primitive in F, then the permutation given by $$C(x) = \frac{-\alpha}{x + 1}$$

gives a cycle of length $p^m + 1$. It is assumed now that the cycle given by $$C(x) = -\frac{\alpha}{x + 1}$$

begins with 0 and ends with ∞, and since 0→−α, it goes 0→−α, ..., →∞.

The eighth column would normally be left blank, but in this embodiment, the method includes substituting the eighth column with a constant column, so that the resultant array is balanced and has symmetric autocorrelation values. The auto-correlation values are as shown in TABLE 3:

TABLE 3

| Autocorrelation Value | +56 | +8 | 0 | −8 |
|---|---|---|---|---|
| Frequency of Occurrence | 1 | 16 | 16 | 23 |

The array can be unfolded using CRT into a sequence, binary representation of which is:

1, 0, 1, 1, 1, 1, 0, 1, 1, 1, 0, 0, 1, 1, 0, 1, 1, 1, 0, 1, 0, 0, 0, 0,
0, 1, 1, 0, 1, 1, 0, 1, 1, 0, 1, 0, 0, 0, 0, 0, 0, 1, 1, 1, 0, 0, 0,
0, 0, 0, 0, 1, 1, 1, 0.

Figure 9:
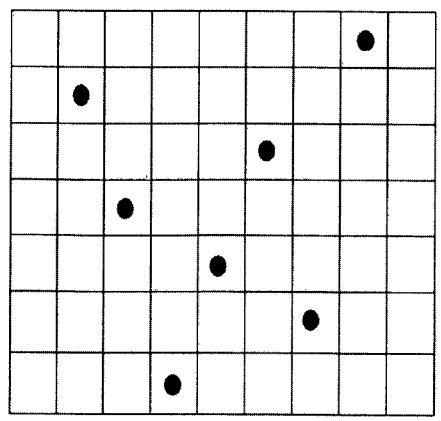
FIG. 9 shows a 9×7 optical orthogonal code array generated from exponential rational construction in accordance with embodiments of the present invention.
Figure 10:
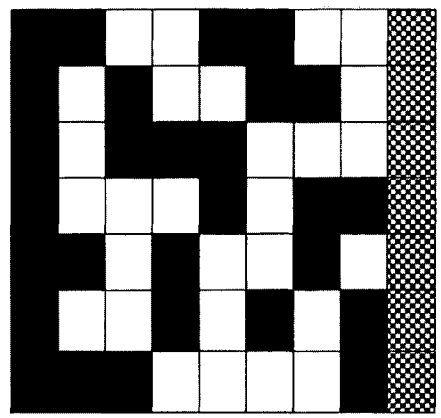
FIG. 10 shows an 9×7 ternary array generated from exponential rational construction with one column substituted by −1, in accordance with embodiments of the present invention (shaded cells are 0's)
Figure 11:
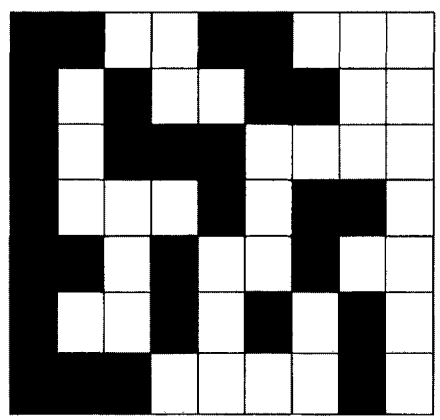
FIG. 11 shows an 9×7 ternary array generated from exponential rational construction with one column substituted by −1 and another column substituted by +1, in accordance with embodiments of the present invention.

A double periodic shift sequence of length (q+1)(q−1) can also be constructed from a cycle generated by a rational function modulo q−1. q+1 and q−1 are relatively prime when q is a power of 2. Such constructions have two blank entries, compared with those of the type (q+1)q. FIGS. 9, 10 and 11 show examples of this construction. The two blanks offer several options of substitution for the purposes of good balance. By contrast, known constructions such as Gold and Kasami have poor balance. For primes of the type $2^n-1$, binary m-sequences can be substituted. For a few suitable primes of the form $4k^2+27$, binary Hall sequences can be substituted. For polynomials of degree d and primes of the type 4k−1, where a binary Legendre column substitution is used, the off-peak autocorrelation and cross-correlation are bounded by $[(d-1)p+d-1]$, whilst the peak is $p(p+1)$. For primes of the type 4k+1 the only substitution possible is a ternary Legendre column, so the off-peak autocorrelaton and cross-correlation are bounded by $[(d-1)(p-1)+d]$ and the peak is $(p-1)^2$.

For comparison of known codes with the codes generated in embodiments of the present invention, for example, the family of Gold codes of length 63 has off-peak autocorrelation and cross-correlation values of −17, −1 and +15. In general, the performance of sequence families depends on their length. Therefore, it makes sense to normalize the parameters and to compare sequences of similar length. The Linear Complexity (LC) of the sequences involved in the present invention up to length 25,000 was tested by computer using the Berlekamp Massey algorithm.

The inventors have developed a theory which yields an estimate of the linear complexity for the new sequences.

TABLE 4 below shows the performance of various constructions produced by embodiments of the present invention compared to the existing constructions. It is clear that many new lengths are added and, in general, the new sequences are superior. R refers to rational map, B refers to balanced Legendre column. The sequences according to embodiments of the present invention are available in many more lengths than traditional sequences, as seen in Table 4.

TABLE 4

| Type | Length | Efficiency % | Normalized Correlation Bound | Balanced Family Size | Total Family Size | Normalized Complexity |
|---|---|---|---|---|---|---|
| Gold | 31 | 100 | 0.29 | 17 | 33 | 0.32 |
| Moreno Tirkel 2 (p = 7) | 42 | 100 | 0.238 | 0 | 48 | 0.453 |
| Moreno Tirkel 2B (p = 7) | 42 | 85.7 | 0.222 | 48 | 48 | >0.5* |
| Moreno Tirkel 2R (p = 7) | 56 | 100 | 0.143 | 48 | 48 | 0.768 |
| Gold | 63 | 100 | 0.27 | 33 | 65 | 0.19 |
| Moreno Tirkel 2 (p = 11) | 110 | 100 | 0.127 | 0 | 120 | ≈0.455 |
| Moreno Tirkel 2B (p = 11) | 110 | 81.8 | 0.156 | 120 | 120 | >0.5* |
| Gold | 127 | 100 | 0.13 | 65 | 129 | 0.11 |
| Moreno Tirkel 2R (p = 11) | 132 | 100 | 0.091 | 120 | 120 | >0.5* |
| Moreno Tirkel 2 (p = 13) | 156 | 92.3 | 0.097 | 168 | 168 | ≈1 |
| Moreno Tirkel 2R (p = 13) | 182 | 85.7 | 0.095 | 168 | 168 | ≈1 |
| Small Kasami | 255 | 100 | 0.067 | 0 | 16 | 0.047 |
| Large Kasami | 255 | 100 | 0.129 | 0 | 4111 | 0.062 |
| Moreno Tirkel 2 (p = 17) | 272 | 94.1 | 0.07 | 288 | 288 | ≈1 |
| Moreno Tirkel 2R (p = 17) | 306 | 88.9 | 0.063 | 288 | 288 | ≈1 |
| Moreno Tirkel 2 (p = 19) | 342 | 100 | 0.064 | 0 | 360 | >0.5* |
| Moreno Tirkel 2B (p = 19) | 342 | 89.5 | 0.072 | 360 | 360 | >0.5* |
| Moreno Tirkel 2R (p = 19) | 380 | 100 | 0.053 | 360 | 360 | >0.5* |
| Moreno Tirkel 3R (p = 19) | 380 | 100 | 0.105 | 6858 | 6858 | >0.5* |

A comparison of the asymptotic behavior of various known sequence families with two of the sequence families of the present invention as L tends to infinity is shown in TABLE 5. The general form of the sequences generated by the present invention, which are derived from higher degree polynomials, is expected to be very useful to a CDMA designer, since it allows for a flexible number of users. The table shows sequences derived from polynomials of degree 2 and 3 only.

TABLE 5

| Type | Normalized Correlation Bound | Balanced Family Size | Total Family Size | Normalized Complexity |
|---|---|---|---|---|
| Gold L = $2^n - 1$ n odd | $L^{-0.5}$ | L/2 | L | 0 |
| Gold L = $2^n - 1$ n even | $2L^{-0.5}$ | L/2 | L | 0 |
| Small Kasami | $L^{-0.5}$ | 0 | $L^{0.5}$ | 0 |
| Large Kasami | $2L^{-0.5}$ | 0 | $L^{1.5}$ | 0 |
| Moreno Tirkel degree 2 | $L^{-0.5}$ | L | L | >0.5 |
| Moreno Tirkel degree 3 | $2L^{-0.5}$ | $L^{1.5}$ | $L^{1.5}$ | >0.5 |

Sequences can be generated mathematically by recursion polynomials, or practically by linear shift registers, which are a physical embodiment of these recursion polynomials. The inventors have established that the recursion polynomials for sequences in the exponential quadratic family have the same structure as the recursion polynomials of the column sequence used in the construction. The long sequence polynomial is obtained by raising the terms in the column sequence polynomial to the power (p−1). This theory has been verified by computer for sequence lengths up to 25,000. The sequences in the families constructed using the rational function map are more complicated, because the columns in the parent array are of two types, so that other terms appear in their recursion polynomials.

The theory has also been verified for ternary column sequences and for different substitutions for blanks in the shift sequence. By using the Legendre sequence as a column sequence, normalized complexities of at least 0.5 can be obtained for all sequence families of the present invention. This is regardless of sequence length. This is the first time such asymptotic performance has been achieved. This can be deduced by theoretical means and has been verified experimentally by the inventors. In fact, the inventors have developed an algebraic method of computing the linear complexity of the long sequence unfolded using CRT and even the recursion polynomial to generate the long sequence.

The Berlekamp-Massey algorithm is a universally accepted means of analysing linear complexity, and hence the most likely tool of an attacker. The output of the Berlekamp-Massey algorithm is the recursion polynomial of the sequence under test. In order to compute the recursion polynomial, the Berlekamp-Massey algorithm requires 2LC terms of the sequence to be known without error. LC is the linear complexity of the sequence. Since our sequences have normalized complexities exceeding 0.5, this implies that an attacker must have access to at least a single repeat of our sequence in order to decode it. In most spread spectrum applications, the user data modulates the spreading sequence, at a repetition rate of the sequence period. Therefore, an attacker has no guarantee of analysing more than a sequence period, without sequence corruption by data modulation. In the case of watermarking, the attacker has access to one period only, and has to guess how to synthesize repeats, without knowing the start and end of a sequence. In summary, the new sequences are practically immune to linear attack, even when the sequence is not corrupted by noise, interference or distortion.

The sequences/arrays described above with reference to FIGS. 2 and 3 can be applied as a bi-phase modulation to a sine wave carrier of a communication signal. The sequences can be used in classical wireless CDMA signals, multi-target tracking radar and sonar signals, medical ultrasound signals, and neonatal audio testing, and the arrays can be used in digital watermarking.

In other embodiments, an alternative array construction is based on the use of the index function, which is an inverse of the exponential function. This is different from the log function, which applies to all finite fields. The index function is restricted to base fields only. The shift sequence is as follows:

$$s_x = \text{ind}_g(Ax^2+Bx+C)$$

Here $x \in Z_p$ (including 0) and g is the primitive root (generator). This generates a p×(p−1) array with p columns, each of length (p−1).

A vertical shift by v generates an equivalent array:

$$s_x \equiv s_x + v = \text{ind}_g(Ax^2+Bx+C) + v = \text{ind}_g(Ax^2+Bx+C) + \text{ind}_g(g^v)$$
$$= \text{ind}_g(Ag^v x^2 + Bg^v x + Cg^v)$$

Choose $Ag^v=1$ from the equivalence class. Therefore, a representative is:

$$s_x = \text{ind}_g(x^2+Bx+C)$$

This array is equivalent to any shift by A places horizontally.

$$s_x = s_{x+h} = \text{ind}_g((x+h)^2+B(x+h)+C) = \text{ind}_g(x^2+(2h+B)x+(h^2+Bh+C))$$

As h ranges over all values, choose B=0.

$$s_x = \text{ind}_g(x^2+C)$$

Re-express this as:

$$s_x = \text{ind}_g(x^2-C')$$

If $C' \notin \mathbb{Q}$, the set of quadratic residues, then $(x^2-C')$ is irreducible, and $s_x$ assumes legitimate values modulo (p−1) for all p values of x. Otherwise, blank columns result, which is undesirable. Since there are $$\frac{p-1}{2}$$

quadratic non-residues in $Z_p$, there are $$\frac{p-1}{2}$$

members in the family of arrays.

The cross-correlation between two arrays is obtained from:

$$\Delta = s_i' - s_{i+h} - v = \text{ind}_g(x^2-C') - \text{ind}_g((x+h)^2-C') - v$$

Let $+v=\lambda$. Then $\text{ind}_g(x^2-C') - \text{ind}_g((x+h)^2-C') = \lambda$.
Therefore:

$$\text{ind}_g\left[\frac{(x^2-C')}{((x+h)^2-C')}\right] = \lambda$$

i.e. $\frac{(x^2-C')}{((x+h)^2-C')} = g^\lambda$ and finally:

$$(x^2-C') = g^\lambda ((x+h)^2-C')$$

This is a quadratic, so there may be 0, 1 or 2 columns matching, as before. In this embodiment, the columns of length (p−1) can be substituted by Sidelnikov sequences of that length. Such columns have auto-correlation values of (p−2) for a full match, and 0 or −2 otherwise. It is not possible to calculate the array correlation in closed form. However, the bounds on the correlations are:

Autocorrelation peak=p×(p−2)
Largest positive off-peak correlation=2×(p−2)
Largest negative off-peak correlation=−2×(p−2).

Therefore, this construction is inferior to the exponential construction discussed before. This is because the family size is halved, the correlation bounds are doubled and the array efficiency is lower. Here, efficiency is the ratio of the number of non-zero entries in the array to the total number of entries.

Figure 4:
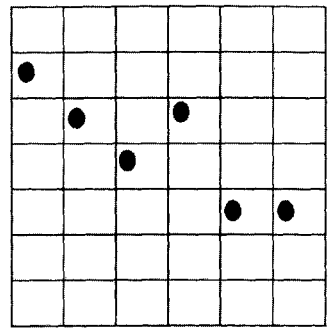
FIG. 4 shows a 6×7 optical orthogonal code array generated from an exponential quadratic in accordance with embodiments of the present invention.

Other embodiments of the present invention include the generation of sequence families that are particularly suited to optical CDMA and frequency hopping. FIG. 4 illustrates an optical orthogonal code (OOC) array having 6 columns and 7 rows generated from the exponential quadratic $g^{2i}+g^i$. Auto and cross-correlation are bounded by 2. Such an array can also be used in frequency hopping. The array can actually be transmitted as 6 columns and 4 rows, since the two bottom rows and the top row are empty. The empty rows can be reinserted at the receiver before performing the correlation. In this manner, the transmission bandwidth is reduced from 7 to 4, thus almost doubling the channel efficiency.

Figure 5:
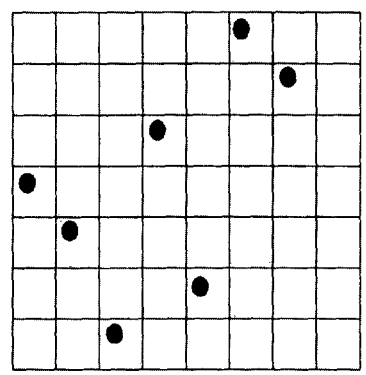
FIG. 5 shows an 8×7 optical orthogonal code array generated using a rational map in accordance with embodiments of the present invention.

FIG. 5 illustrates an optical orthogonal code (OOC) array having 8 columns and 7 rows generated from a rational map. Auto and cross-correlation are bounded by 2. Note, that in this case, the array has one empty column out of 8. Therefore, only 7 time slots need to be assigned to the transmitter, thus increasing transmission efficiency by 14%. The empty time slot can be re-inserted in the receiver, prior to the correlation.

The arrays described above with reference to FIGS. 4 and 5 can be applied as a frequency-time or wavelength-time pattern. The dots represent the locations of transmission in the two dimensional pattern. The exponential function has inverses in the form of the index function, which applies only to the base field, and in the form of the discrete logarithm function, which applies to all finite fields. Both inverse functions are defined for all field elements except 0.

As an example of the index function construction, an irreducible quadratic is chosen, for example: $i^2+3i+1$. In this example p=7:

$$s_i = \text{ind}_3(i^2+3i+1) = 0,5,4,5,0,3,3$$

Figure 6:
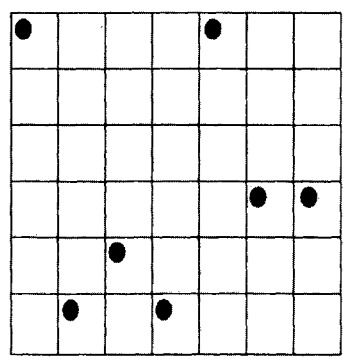
FIG. 6 shows a 7×6 inverse array generated from an index function in accordance with embodiments of the present invention.

This defines a 7×6 inverse array having 7 columns each of length 6, as shown in FIG. 6. This array has two empty rows in the middle. However, because all of the arrays of the present invention use doubly periodic correlation, this array is equivalent to any doubly periodic shift of itself. If all the rows were shifted upwards by one, the two empty rows would be on top. Therefore, the transmitter need only send 4 out of 6 tones, thus increasing channel efficiency by 50%.

Figure 7:
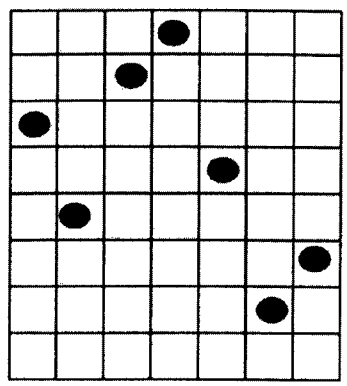
FIG. 7 shows an inverse array based on the rational map of FIG. 4.

A similar procedure can be applied to a rational map and an inverse array based on the rational map is shown in FIG. 7. This array contains an empty row on the bottom, so once again, the channel efficiency can be increased by 14% by not sending the empty row.

The arrays described above in relation to FIGS. 6 and 7 and other family members could be used for OCDMA or for frequency hopping. Alternatively, they could be adapted for watermarking, by substituting the columns of length 6 or 8. Suitable column substitution sequences are Sidelnikov sequences of length 6 or 8. These are preferred because, apart from a leading 0 entry, all the other entries are +1 or −1, and the sequences are balanced and have a constant off-peak autocorrelation of −1. Alternatively, suitable sequences over a higher alphabet could be chosen as columns.

Figure 8:
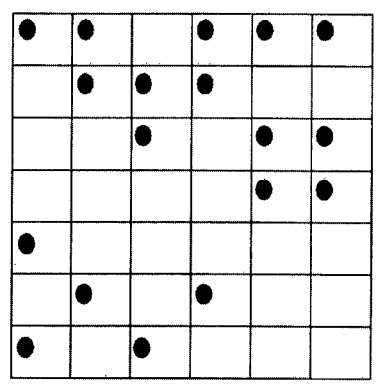
FIG. 8 shows the array of FIG. 3 with columns substituted by a binary (0,1) Legendre sequence length 7.

The arrays described above can be considered as sparse, in that each column contains at most one dot (transmission in the two dimensional pattern). The arrays whose column lengths are prime can be made "denser" by substituting each column by a binary (0,1) Legendre sequence of commensurate length. An example of such a substitution for the array described above in relation to FIG. 4 is shown in FIG. 8 wherein the binary (0,1) Legendre sequence is of length 7. The peak correlation for this array is 10. This is because at most, 2 columns can match, contributing a correlation of 6, whilst the remaining 4 columns cannot match, contributing a correlation of 4. The array fill fraction is 18/42. There are 6 such arrays, whose cross-correlation is also bounded by 10. In general, the construction in this embodiment of the present invention yields arrays of the type $$\left[(4k-1)(4k-2), \frac{(4k-2)^2}{2}, (4k^2-4k+2)\right]$$

for a prime of the type (4k−1). Larger arrays follow a similar pattern. Such sequence families are particularly suitable for multi-wavelength optical communications and multi-tone frequency hopping.

FIG. 9 shows an optical orthogonal code or frequency hopping pattern which is obtained by using a single cycle map over $\{GF(2^3)\} \cup \{\infty\}$ followed by a permutation of the type 1/x The resulting shift sequence is −, 1, 3, 6, 4, 2, 5, 0, −. This array has an array off-peak autocorrelation bounded by 2. When used as an optical orthogonal code or frequency hopping pattern, two time slots could be eliminated, as outlined above.

The columns with integer entries can be substituted by equivalent cyclic shifts of an m-sequence of length 7, producing the array in FIG. 10. Note, that in this case one of the blank columns was substituted by a column of −1's. This balances the array. The array can be unfolded into a sequence of length 63, with 7 entries of 0, 28 entries of −1 and 28 entries of +1. The peak autocorrelation is 56, whilst the highest off-peak value is 9. In comparison, Gold codes exist for the same length, but their highest correlation is only 17.

The array of FIG. 10 could have the remaining column substituted by +1's, as shown in FIG. 11. Such an array or unfolded sequence has a peak correlation of 63 and a worst case off-peak correlation of 11. This sequence/array has an imbalance of 7. Both variations above in FIGS. 10 and 11 outperform known Gold codes of the same length in terms of correlation and linear complexity.

A larger example of this method, using the finite field $GF(2^4)$ results is a shift sequence of length 17: −, 1, 4, 13, 9, 14, 5, 6, 8, 10, 11, 2, 7, 3, 12, 0, −. This produces an array of size 17×15. It can be used as an optical orthogonal code or as a frequency hopping sequence. Note that once again, the end columns are blank, so they could be omitted during transmission.

The columns with integer shifts can be substituted by equivalent shifts of an m-sequence of length 15. This array can be unfolded into a binary or ternary sequence of length 255. Therefore, it is commensurate with the length of the small and large Kasami sets.

It can be seen that the above shift sequence produces an array which has at most one dot per row. Therefore, it is also possible to substitute the rows by a pseudo-noise sequence of commensurate length. In the above example, this would be a ternary Legendre sequence of length 17. There are other cases, where substitution of rows or columns is possible, thus leading to the construction of new and different arrays for CDMA and other applications.

In yet further embodiments, it is also possible to use the constructions described herein recursively. For example, take Construction A1 or A2 where the polynomial is of degree one, i.e. the well-known exponential Welch construction. The parent array has p−1 columns each of length p. Substitute the columns with commensurate shifts of a pseudo-noise sequence, e.g. a Legendre sequence. This array can be unfolded into a sequence of length (p−1)p using CRT. Such a sequence has three valued autocorrelation: (p−1)p, +1, −p. Quite often (p−1)p=p'+1 where p' is another prime. Therefore, such a sequence can be used to substitute the non-blank rows of Family B, which are of commensurate length. This produces a family of sequences of length $p^4-2p^3-2p^2+3p+2$ with low off-peak autocorrelation, low cross-correlation and high linear complexity. Hence, the methods of the present invention can also be used in cascade.

According to some embodiments, the method of modulating a communication signal includes converting singly or doubly periodic shift sequences from m-sequences using a trace map and discrete logarithm to obtain families of shift sequences with correlation 2. These families also include a "parent" sequence with correlation 1. Most of these shift sequences are new, and can also be used as new frequency hopping codes, or in our constructions, where columns or rows are substituted by suitable binary sequences to produce CDMA codes. Special cases of this method include the small Kasami set and the No-Kumar set. Because these sets originate from an m-sequence, they have a normalized complexity which asymptotes to zero, even if their m-sequence columns are substituted by Legendre sequences. This is in contrast to the other sequences constructed by our method, which do not originate from m-sequences.

According to some embodiments, where the shift sequence is obtained from an m-sequence, and the substitution column is a ternary or other non-binary pseudo-noise sequence, a new long pseudo-noise sequence obtained by CRT from the array results.

In some embodiments, the family of sequences produced by using the shift sequence to construct arrays which are then unfolded using CRT has a linear complexity greater than 45% of the sequence length, regardless of the sequence length.

Figure 12:
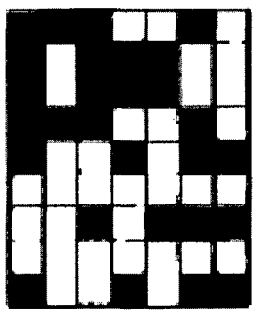
FIG. 12 shows a set of known small Kasami sequences of length 63 arranged in array format.
Figure 12:
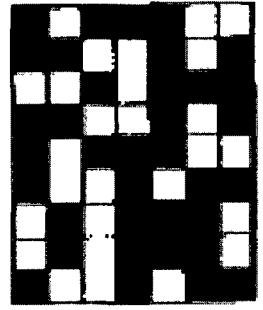
Figure 12:
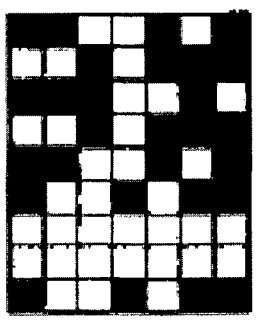
Figure 12:
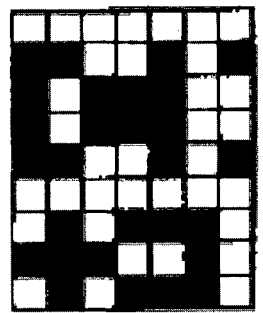
Figure 12:
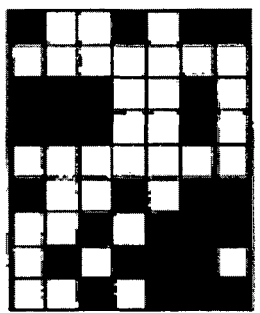
Figure 12:
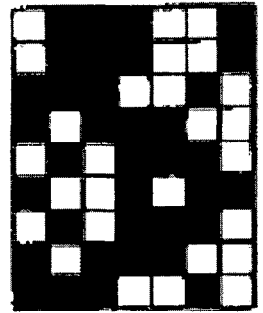
Figure 12:
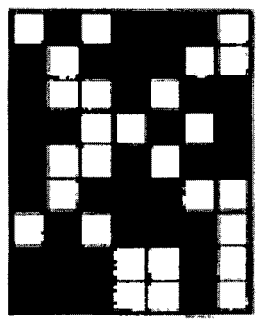
Figure 12:
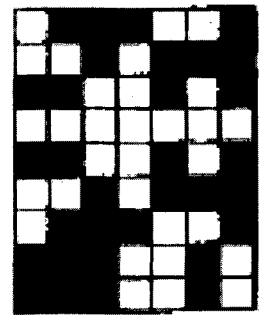

Also, it is possible to construct new shift sequences and frequency hopping patterns from known CDMA constructions. In their paper "Families of sequences and arrays with good periodic correlation properties, IEE PROCEEDINGS-E, Vol. 138, No. 4, JULY 1991" D. H. Green and S. K. Amarasinghe present known Kasami sequences and their derivatives, the No-Kumar sequences written in array format. FIG. 12 reproduces such a set of arrays from their paper. It is apparent that all these arrays contain cyclic shifts of an m-sequence and constant columns. The sequence of shifts, treating constant columns as blanks has auto and cross-correlation bounded by 2 for the small Kasami and No-Kumar arrays. Therefore, the sequence of shifts obtained from such arrays can be used as a shift sequence for some of the constructions of the present invention, and the columns can be substituted by suitable pseudo-noise sequences, such as Legendre or Hall, yielding new arrays with identical correlation properties, and sometimes with much higher linear complexity and therefore immunity to attack. Additionally, sometimes, the arrays can be unfolded into sequences and refolded in a different format, leading to still more such arrays.

Alternatively, the shift sequences can be used in their own right as new frequency hopping patterns, time hopping patterns or Optical Orthogonal Codes.

Figure 13A:
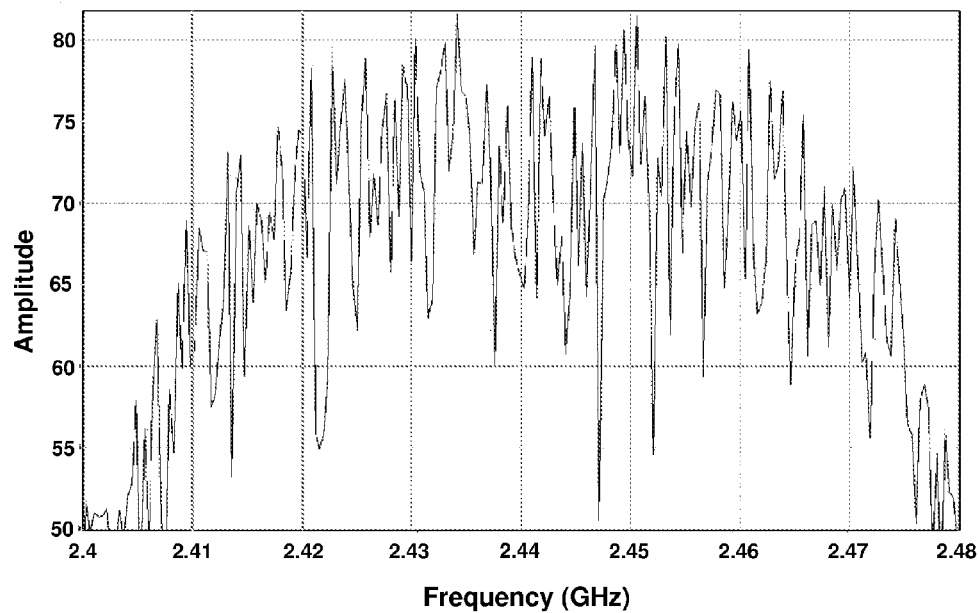
FIG. 13A shows the power spectrum of a 2.4425 GHz RF carrier phase modulated by a known Kasami sequence of length 63.
Figure 13B:
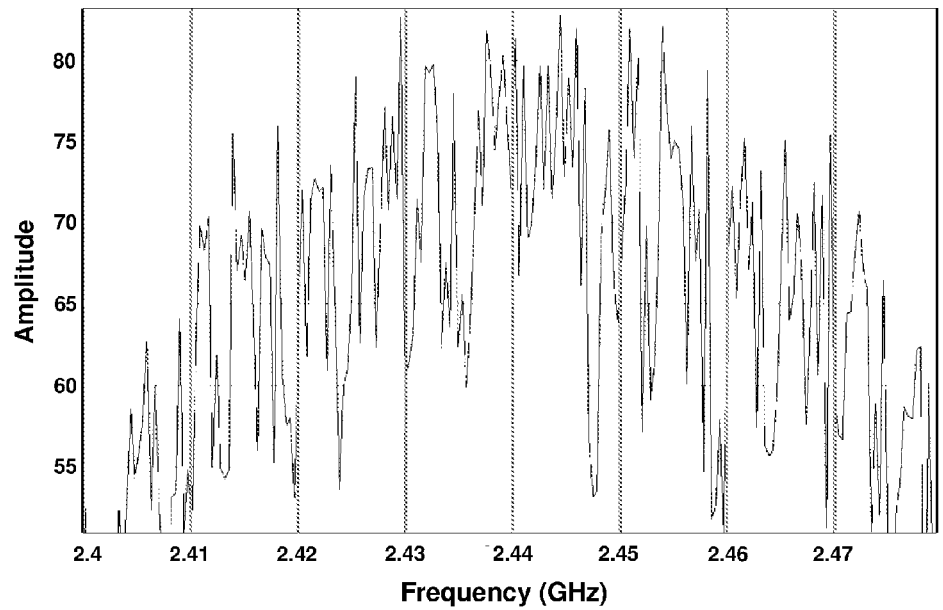
FIG. 13B shows the power spectrum of a 2.4425 GHz RF carrier phase modulated by a sequence of length 63 obtained from a 9×7 array from FIG. 11 in accordance with embodiments of the present invention.

One of the objectives of spread spectrum sequences is to provide good spectral occupancy of the allowed frequency band, for example the unlicensed Industrial, Scientific, and Medical (ISM) band from 2.4000 to 2.4835 GHz. An ideal spread spectrum sequence is pseudo-noise, i.e. the sequence possesses a two-valued autocorrelation. Because of the digital modulation, this produces a sinc function power spectrum. Families of sequences used in CDMA applications have good cross-correlation, but their autocorrelation takes on more values than 2. As a result, their power spectral density is more jagged. The spectrum of a 2.44175 GHz RF carried modulated by a typical Kasami sequence of length 63 is shown in FIG. 13A. By comparison, the spectrum of a typical Moreno-Tirkel sequence of the same length, obtained by unfolding the 9×7 array of FIG. 11 is shown in FIG. 13B. Both spectra track a sinc function envelope, but the central part of the spectrum of the I sequence according to the present invention in FIG. 13A is slightly better. This may be due to its superior balance. In any case, if a system utilizing Kasami sequences for CDMA had its spreading sequences substituted by sequences, a slight improvement in spectral occupancy is likely to result.

The +/−1 and (0,1) sequences described above can be applied simultaneously to acquire and/or track targets in a multi-target scenario for short range multi-target radar and sonar. Hence, embodiments of the present invention include applying the shift sequences described herein as frequency hopping sequences for radar and detecting the presence of the shift sequences by setting a correlation threshold of 3 for quadratic constructions and 4 for cubic constructions.

Embodiments of the present invention also have application in cryptography. The constructions generate long sequences with high linear complexity from shorter sequences, which can be used, for example, in stream or block ciphers.

The constructions described in this patent application can be used in their two-dimensional form in wireless communications. For example, the arrays described with reference to the drawings can be used as m×n arrays, where m is the number of time slots required to carry the coded information and n is the number of orthogonal tones in an Orthogonal Frequency-Division Multiple Access (OFDMA) signal set. m and n need not be relatively prime. In cases where two orthogonal polarizations are deployed (e.g. vertical and horizontal, or left and right hand circular), the column length becomes 2n. Also, the orthogonal tones and the polarizations need not be arranged in a one dimensional form, but can be folded into an abstract space of arbitrary dimension. Therefore, the multi-dimensional array constructions described in the Applicants' patent application WO 2011/050390 can be used for the purposes of multiple access communication or radar. This applies regardless of whether the columns or folded arrays are substituted by suitable sequences or arrays to produce a multiplexed data stream, or whether the shift sequence is used as a selector of one out of a set of orthogonal tones and polarizations.

Hence, embodiments of the present invention include methods and apparatus for modulating and encoding communication signals that address or at least ameliorate one or more of the aforementioned limitations of the prior art or at least provides a useful and effective alternative.

The new sequence families for wireless CDMA described herein have correlation performance which at least equals or surpasses the known Gold and Kasami sequence families. The exponential quadratic families are nearly optimal with respect to the Welch bound, whilst the rational function families are optimal, i.e. for a given length no families with better correlation can exist.

The sequences come in many variations, all except one of which are balanced, and all of which have much higher linear complexity than the known constructions, thus making them immune to linear attacks and rendering them particularly suitable for cryptography applications. The methods of the present invention include converting frequency hopping patterns into CDMA sequences and the converse, and deriving many patterns from m-sequences.

The new sequences are available in more lengths, which fill in the gaps in lengths of the Gold and Kasami sequences. The new sequences do not compete with the known sequences, but complement them, thus affording the user more flexibility in designing communication networks. The new constructions also deliver frequency hopping sequences and sequences for optical CDMA, multi-target radar and sonar, GPS and ultrasound. In this specification, the terms "comprise", "comprises", "comprising" or similar terms are intended to mean a non-exclusive inclusion, such that a system, method or apparatus that comprises a list of elements does not include those elements solely, but may well include other elements not listed.

Throughout the specification the aim has been to describe the preferred embodiments of the invention without limiting the invention to any one embodiment or specific collection of features. It is to be appreciated by those of skill in the art that various modifications and changes can be made in the particular embodiments exemplified without departing from the scope of the present invention.

The invention claimed is:

1. A method of modulating a communication signal including:
    generating a family of shift sequences having lengths relatively prime using exponential, logarithmic or index functions and a polynomial or a rational function polynomial in $i \in \mathbb{Z}_{p-1}$ for a finite field $\mathbb{Z}_p$ of prime p;
    substituting multiple columns of arrays having a relatively prime size with pseudo-noise sequences in a cyclic shift equal to the shift sequence for the respective column of the arrays to generate a substituted array;
    unfolding sequences from the arrays using Chinese Remainder Theorem; and
    applying the unfolded sequences to a carrier wave of the communication signal to generate a phase modulated communication signal.

2. The method of claim 1 wherein a shift sequence of the family has the form: $s_i = Ag^{2i} + Bg^i + C$ where g is a primitive root (generator) of $Z_p$ and i ranges from 1 to p−1 where A, B, C are elements of the base field $Z_p$.

3. The method of claim 1, including generating one of the following:
    a (p−1)×p array having (p−1) columns each of length p; or
    a p×(p−1) array with columns, each of length (p−1) where the index function is used.

4. The method of claim 1, wherein the step of generating the family of shift sequences includes one of the following:
    using full cycles generated by a rational function map, producing p×(p+1) arrays with p columns, each of length (p+1), wherein the rational function map is the Family B rational function map;
    using known frequency hopping patterns, time hopping patterns or optical orthogonal codes;
    transforming known CDMA families into shift sequences, wherein the known CDMA families are one of the following: small Kasami sequences; large Kasami sequences; No-Kumar sequences.

5. The method of claim 1, wherein the pseudo-noise sequence is over any alphabet and can be one of the following: a binary or almost binary Legendre sequence; a ternary or polyphase Legendre sequence; a binary or polyphase m-sequence; a GMW sequence; a twin prime sequence; a Hall sequence; a Sidelnikov sequence; another low off-peak autocorrelation sequence.

6. The method of claim 1, wherein the substituted array is in the form of, or used for the modulation of one of the following: a bi-phase array for modulation of a CDMA signal; a multi-target tracking radar signal; a multi-target tracking sonar signal; an ultrasound signal; an optical orthogonal code array for modulation of an optical CDMA signal.

7. The method of claim 1, including substituting at least one column of the arrays with a constant column such that the substituted array is balanced and has symmetric auto-correlation values, optionally including substituting blank columns in the shift sequence to balance a CDMA sequence.

8. The method of claim 1, including substituting multiple rows of the arrays with an array comprising a maximum of one dot per row.

9. The method of claim 1, including constructing groups of families of sequences or arrays by applying invariance operations to parent arrays and unfolding the parent or the transformed arrays using the Chinese Remainder Theorem.

10. The method of claim 9, including assigning different groups of users different families of sequences or arrays.

11. The method of claim 1, wherein the shift sequences are used in their own right for one of the following: frequency hopping patterns; time hopping patterns; optical orthogonal codes; sonar sequences.

12. The method of claim 1 including increasing linear complexity by using a shift sequence and a column sequence in composition, optionally including unfolding the composition into a long sequence using the Chinese Remainder Theorem, so that the resulting multidimensional array can be used in image, audio, video or multimedia watermarking.

13. The method of claim 1 including generating a family of multidimensional arrays using a composition of a family of shift sequences or frequency hop patterns and a column sequence and modulating the phase of a multiplicity of orthogonal carriers and optionally dual polarization.

14. The method of claim 1, wherein the unfolded sequences are used as one of the following: an error correcting code; a cryptographic code.

15. The method of claim 1 including converting a column solitary sequence with low off-peak autocorrelation into a family of longer sequences or arrays with low off-peak autocorrelation and cross-correlation.

16. The method of claim 1 including unfolding a solitary array from Construction A1 or A2 using a degree one polynomial using Chinese Remainder Theorem, and substituting rows in a larger array used to produce Family B with commensurate row length with the unfolded solitary array, resulting in a family of even larger arrays with good correlation and high linear complexity.

17. The method of claim 16, wherein the substitution is performed as a cascade or the process is performed recursively.

18. The method of claim 1, wherein the family of sequences produced by using the shift sequence to construct arrays which are then unfolded using Chinese Remainder Theorem has a linear complexity greater than 45% of the sequence length, regardless of the sequence length.

19. The method of claim 1, wherein the shift sequence is obtained from an m-sequence, and the substitution column is a ternary or other non-binary pseudo-noise sequence, resulting in a new long pseudo-noise sequence obtained by Chinese Remainder Theorem from the array.

20. The method of claim 1, wherein a family of shift sequences is obtained by a combination of trace map and discrete logarithm from a singly or doubly periodic shift sequence produced by an m-sequence.

21. The method of claim 20, where the family thus produced is the small Kasami set, or the No-Kumar set.

22. A device for modulating a communication signal, the device comprising:
    a transceiver for receiving and transmitting the signal;
    a storage medium storing computer implemented programme code components to generate sequences; and
    a processor in communication with the storage medium and the transceiver to execute at least some of the computer implemented programme code components to cause:

generating a family of shift sequences having lengths relatively prime using exponential, logarithmic or index functions and a polynomial or a rational function polynomial in $i \in \mathbb{Z}_{p-1}$ for a finite field $\mathbb{Z}_p$ of prime p;

substituting multiple columns of arrays having a relatively prime size with pseudo-noise sequences in a cyclic shift equal to the shift sequence for the respective column of the arrays to generate a substituted array;

unfolding sequences from the arrays using Chinese Remainder Theorem;

applying the unfolded sequences to a carrier wave of the communication signal to generate a phase modulated communication signal.

\* \* \* \* \*